United States Patent
Fong

(10) Patent No.: US 9,641,956 B2
(45) Date of Patent: May 2, 2017

(54) DYNAMIC FLOW MANAGEMENT

(71) Applicant: Verizon Patent and Licensing Inc., Arlington, VA (US)

(72) Inventor: Adelene Siew Li Fong, Congers, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 218 days.

(21) Appl. No.: 14/559,980

(22) Filed: Dec. 4, 2014

(65) Prior Publication Data

US 2016/0164783 A1   Jun. 9, 2016

(51) Int. Cl.
*H04L 12/801* (2013.01)
*H04W 4/00* (2009.01)

(52) U.S. Cl.
CPC .................. *H04W 4/001* (2013.01)

(58) Field of Classification Search
CPC ....... H04L 47/10; H04L 5/0007; H04W 4/001
USPC ........................................ 370/437, 331, 328
See application file for complete search history.

(56) References Cited

U.S. PATENT DOCUMENTS

| | | | |
|---|---|---|---|
| 8,504,070 B2 * | 8/2013 | Dowlatkhah | H04W 4/00 455/432.1 |
| 2004/0010569 A1 * | 1/2004 | Thomas | H04L 41/0806 709/220 |
| 2006/0187878 A1 * | 8/2006 | Calhoun | H04W 36/0033 370/331 |
| 2014/0199998 A1 * | 7/2014 | Balasubramanian | H04J 11/0093 455/434 |
| 2014/0286242 A1 * | 9/2014 | McCann | H04W 76/021 370/328 |

* cited by examiner

*Primary Examiner* — Kwang B Yao
*Assistant Examiner* — Syed M Bokhari

(57) ABSTRACT

A device and method comprises receiving a network request, and provides a dynamic flow management and a conditional logic provisioning command driver in the form of a computational instruction in response to the network request. The network request is received by a processor accessible in a network from at least one requesting subscriber unit subscribing to a first network service configuration. A conditional logic provisioning command driver is provided in response to the network request by the processor to reconfigure the first network service configuration to a second network service configuration according to the received network request. The conditional logic provisioning command driver may be implemented conditionally according to at least one business rule associated with at least one value defined by the network request.

15 Claims, 5 Drawing Sheets

DYNAMIC FLOW MANAGEMENT

BACKGROUND

As network services become more complex, software is increasingly required to provide additional network services. However, to re-provision network services, conventional wireless network software that automates updated or modified wireless network services needs to be re-configured, thereby requiring expensive, manual re-programming.

DETAILED DESCRIPTION

Figure 1:
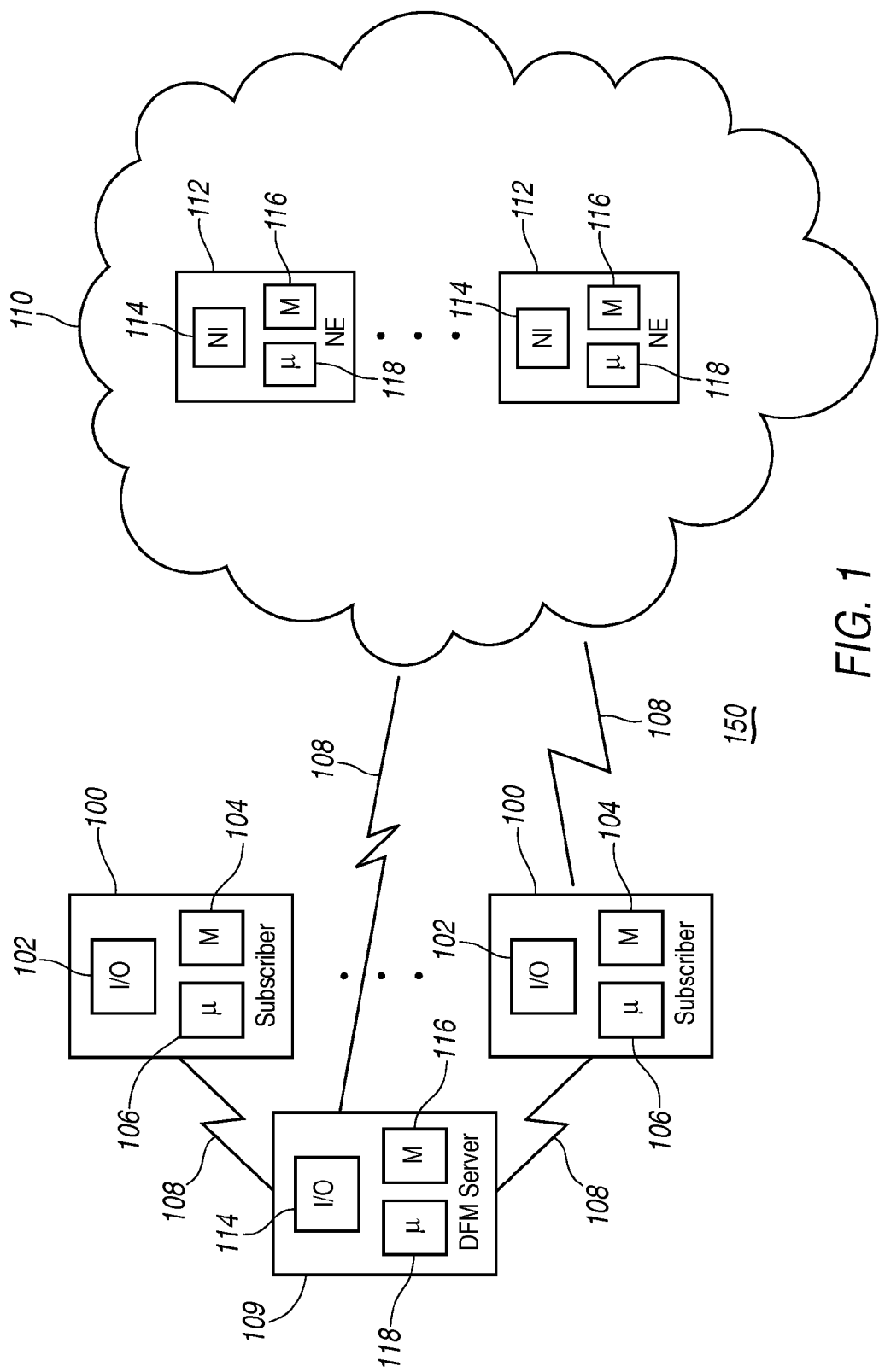
FIG. 1 illustrates an exemplary system showing a network using at least one subscriber unit, a server, and a network element wherein the system includes at least one processing method, which provides dynamic flow management and a conditional logic provisioning command driver in response to wireless network requests.

FIG. 1 illustrates an exemplary system 150 showing a network embodying at least one inventive aspect to provide dynamic flow management using a conditional logic provisioning command driver (i.e., "driver") in response to at least one network request. The driver is understood to include at least one software program or other programmable code executable by at least one processor 106, 118, which is stored in memory 104, 116.

The driver may respond to at least one network service request, for example, automatically responding to at least one business rule such as may be present in the form of .xml and/or Boolean logic format instructions or commands, at least as part of a dynamic flow management scheme described herein. The driver may include a parser module that automatically parses the at least one business rule to respond to certain network service requests and to provide responsively, for example, a report, alarm, etc., on a per-process request basis.

Generally, system 150 may embody a dynamic flow manager apparatus or management process that includes at least one conditional logic provisioning command driver, particularly to enable a dynamic flow configuration and using one or more business rules that in an exemplary approach may incorporate a Boolean language. Configuration flows are provided as commands in a database that represent the business rules. Additionally, when commands in the database are changed, the configuration process is restarted. Furthermore, it is possible to nest hierarchically additional service request processes under or within a given service request process. Such a hierarchically nested set of service request processes may be handled by a common flow manager. For example, a hierarchically nested set of service request processes may arise appropriately when the same subscriber unit provokes a series of related service requests, such as common accounting transactions by the same subscriber.

More particularly, a network request may be received by a processor accessible in a network from at least one requesting subscriber unit subscribing to a first network service configuration. Then a driver may be provided in response to the network request by the processor to the at least one requesting subscriber unit to reconfigure the first network service configuration to a second network service configuration, according to the received network request.

Generally, this automated provisioning scheme may apply to networks (e.g., a wireless and/or wired distributed network) or to a system (e.g., a telecommunications or computer system) that requires an input or request from at least one subscriber or participant. Then the scheme automatically provisions a network service or processing flow change.

Dynamic flow management is not limited to provisioning network elements, although provisioning network elements is an illustrative example of at least one possible application. Hence, any system requiring input and results in a flow change may use dynamic flow management, as described herein.

For example, an upstream networked client device running an application sends a request downstream. This request may be an .xml format request to a driver. The driver may then check the request against a configuration flow provided in a database. The driver may determine using formatted Boolean logic to provide a corresponding flow for execution. Thus, in response to the upstream originated request, an output is generated downstream. For example, this response may satisfy a requested wireless network service via at least one provisioning command in the case of an illustration focusing on a wireless network. For example, at least one provisioning command may represent a modification to a network service. It may also include a notification (e.g., a printer update, an email message, a report, a multi-media stream, or other responsive subscriber information).

The term "subscriber" or "subscriber unit" is understood in accordance with a first implementation of approaches generally to represent or correspond to at least one request associated with or obtained from an upstream client device, such as a mobile telephone, a cellphone, a smart phone, a tablet, a personal computer, a pager, a media appliance, or other network-accessible computing device. In accordance with a second implementation of approaches the term "subscriber" or "subscriber unit" can be a point-of-sale front end that could be a specific computing device or a system of such devices and associated infrastructure that represent a billing system such that a subscriber sends a request by way of the billing system as discussed in more detail below.

Generally, at least one driver may enable at least one processor execution of at one software application to manage at least one flow associated conditionally with at least one network request. With this conditional approach, conditional flow management is automated dynamically to provide a real-time response. Thus, this real-time approach enables un-compiled re-provisioning of at least one command associated with at least one requested network service. In particular, un-compiled re-provisioning by the at least one processor of network services may be facilitated by accessing a library of reusable commands stored in a database or cache memory accessible to at least one processor. Also, at least one re-provisioned network service may comply with at least one programmable business rule for dynamic flow management stored in the database or cache memory. It is further contemplated that at least one network request may enable dynamic flow management of at least one driver generated automatically by the processor according to at least one business rule.

Furthermore, the at least one network request may be configured substantially according to an Extensible Markup Language (XML/.xml) format.

System 150 may take different forms and include multiple and/or alternate network element components and subscriber facilities. While an exemplary system 150 is shown in FIG. 1, the exemplary components illustrated in FIG. 1 are not intended to be limiting. Indeed, additional or alternative network elements and subscriber unit components and/or implementations may be used.

As illustrated in FIG. 1, system 150 includes at least one subscriber or mobile and/or non-mobile unit 100. Each unit 100 may include a user interface input/output (I/O) 102, a processor 106, and a database or storage memory 104. Units 100 may be a telephone, a cellular phone, a smart phone, a tablet, a telematics appliance, a pager, an audio telephonic or video conferencing device, or any other telecommunication or media apparatus. Units 100 may be enabled electronically to facilitate wireless and/or wired communication. Units 100 may interact synchronously or asynchronously via one-way or two-way text, data, audio, video or other media content with other units 100 by subscribers or non-subscribers. In an alternative illustrative approach, units 100 may represent a one or more point-of-sale user interfaces such as that used with billing systems. The point-of-sale user interfaces may each represent a separate computing device 100 or be incorporated into a larger computing device 100 providing a plurality of user interfaces.

Processor 106 may be any computing hardware including at least one computer, server, microprocessor, digital signal processor, controller, microcontroller, or other computing system and/or other computational device.

System 150 further includes communication signaling 108 between at least one subscriber units 100 and at least one wireless communication network 110, including at least one network element 112. Disposed between subscriber units 100 and at least one network element 112 within the at least one wireless communication network 110 may be at least one server 109 acting as a data flow manager ("DFM"). As illustrated, subscriber units 100 may communicate with server 109 and the results of the communication resulting in communication from server 109 to a network element 112. Alternatively or in addition, the communication between a subscriber unit 100 and the server 109 may result in the subscriber unit communicating with a network element 112. Signaling 108 may be a mixture of wired or wireless communication and may involve one or more communication networks 110, one of which is illustrated as being a wireless communication network if it involves communication from a mobile device 100.

Server 109 and each network element 112 includes network interface 114, processor 118, and database or memory 116. Processor 118 may be any computing hardware including at least one computer, server, microprocessor, digital signal processor, controller, microcontroller, or other computing systems and/or other computational devices.

In general, computing systems and/or devices, such as processors 106, 118 may employ any of a number of computer operating systems, including, but not limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Examples of computing devices include, without limitation, a computer workstation, a server, a desktop, notebook, laptop, or handheld computer, or some other computing system and/or device. Computing devices, such as processors 106, 118, generally include computer-executable instructions such as the instructions of processors 106, 118, where the instructions may be executable by at least one computing device such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing at least one process, including at least one of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory.

Volatile media may include, for example, dynamic random access memory (DRAM), which typically constitutes a main memory. Such instructions may be transmitted by at least one transmission medium, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms such as memory 104, 116 for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, such as system 150, and are accessed via a network in any at least one of a variety of manners. A file system may be accessible from a computer operating system, and may include files stored in various formats.

An RDBMS generally employs the Structured Query Language (SQL) in addition to a language for creating, storing, editing, and executing stored procedures, such as the PL/SQL language mentioned above. In some examples, system elements may be implemented as computer-readable instructions (e.g., software) on at least one computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
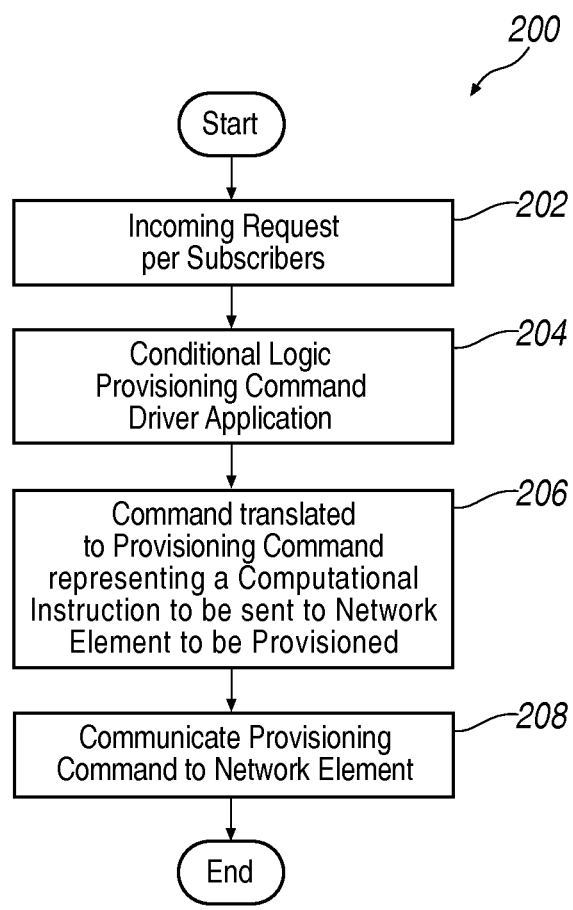
FIG. 2 illustrates an exemplary process flow of providing a dynamic flow management and a conditional logic provisioning command driver in response to at least one network request.

FIG. 2 illustrates an exemplary process flow 200 that shows dynamic flow management computational steps performed by at least one processor 118 of a server 109. For example, process flow 200 may be performed by at least one processor 118, which automatically processes incoming requests per subscriber as shown in block 202. A conditional logic provisional command driver application may be initiated at block 204 such as by way of server 109, which uses business rules such as those that may incorporate Boolean logic of at least "NOT", "OR" and "AND" to come up with a command to execute. At block 206 the command is translated to a provisioning command that may be any computational instruction that an external downstream network element 112 may understand, and which is then communicated either from server 109 or by way of a subscriber device 100 in communication with server 109 to receive the provisioning command for transmission to network element 112. This step is shown in block 208.

More generally, each such computational step may generally contribute toward providing dynamic flow management and a conditional logic provisioning command driver in response to wireless network requests. Particularly in response to wireless network requests, which is an example of a possible use of system 150, automated provisioning of dynamic flow management and at least one driver may enable uniquely easier and more efficient deployment of various new business cases or other wireless network services without necessarily programming new computer software or other code. This results in enhanced speed with increased efficiency, all while reducing overall cost.

The advantageous ease and efficiency arises from utilizing a dynamic flow management approach, which is associated with server 109 in an exemplary approach. In particular, at least one driver may be used to access and execute various database driven provisioning flows without having to recompile code. This automatically satisfies certain wireless network requests at least in part due to eliminating unnecessary software production steps. For example, at least one code compilation or build cycle may be eliminated to launch changes to wireless network services.

Thus, advantageously in response to various network request conditions, using a dynamic flow management and conditional logic provisioning command drivers automatically provides an efficiently simple method to map effectively various network request conditions to different commands. This response may be accomplished without any additional code development, or conventional coding change. Furthermore, such conventional coding change would disadvantageously require network applications to be brought down, resulting in substantial service delay due to code programming interruption or otherwise waiting for next code build cycle.

Accordingly it is contemplated herein that computer-implemented conditional or Boolean logic code, software, firmware, or computer program is employed automatically to provision dynamic flow management and at least one command driver or equivalent code or computer instruction in response to wireless and/or wired network requests. In one exemplary approach, the business rules represent Boolean logic in the form of at least "AND", "OR" and "NOT".

For example, as illustrated via computer-automated software steps in flow chart of FIG. 2, step 202 may represent automatically detecting by at least one network elements 112 at least one incoming request for wireless network service by at least one subscriber unit 100. The at least one network elements 112 may include at least one network-accessible computer, server, or other data processing hardware device configured to detect and respond to at least one incoming request for wireless network service.

The at least one incoming request, which is generated from at least one subscriber unit 100 may be provided to the one network element 112 after the operation of server 109. The at least one incoming request may be formatted to contain subscriber indication of at least one wireless network service.

Furthermore, block 204 may represent operation of a conditional logic provisioning command driver application while block 206 may represent the command from the application being translated to a provisioning command representing a computational instruction to be sent to the network element 112 to be provisioned per the subscriber request. In the illustrated example, what is communicated in block 208 is at least one provisioning command or equivalent code or computer instruction for handling wireless network servicing for at least one subscriber unit 100. Thus, block 208 may represent automatically commanding with at least one network element 112 the provisioning of at least one subscriber unit 100.

More specifically, in the illustrative approach using a conditional logic provisioning command driver application associated with block 204, a business rule may represent automatically using Boolean logic and/or other equivalent language or a rule-set by network element 112. This representation facilitates at least one provisioning command for handling wireless network servicing of at least one subscriber unit 100. Automatically, the Boolean logic and/or other equivalent language or a rule-set, and provisioning command are communicated to network element 112 as set forth in block 206. At least one processor 118 from at least one memory 116 of network element 112 uses the provisioning command to detect at least one incoming request for wireless network service.

In particular, at least one driver may be stored in at least one memory 116 of server 109 and used automatically by server 109 to interpret Boolean logic and/or other equivalent language or rule-set. The at least one driver enables comparison of content of a service request against at least one related pre-configured flow command. The at least one driver may generate an output command that is then configured as a provisioning command to be sent to the corresponding network element 112 such as from server 109 or from the server 109 by way of a subscriber unit 100.

The at least one driver may be formatted using business rules in the form of Boolean logic and/or other equivalent language or a rule-set, and stored in at least one table, database or memory 116 associated with a server 109. Thus, based on the type of wireless network service request requiring dynamic flow management and command provisioning, the at least one driver is configured based on the particular incoming .xml service request, as well as any automated business rules for servicing wireless network service requests.

In particular, after checking at block 202 the incoming request for wireless subscriber service change, the at least one driver determines which provisioning flow and command 208 to execute automatically based on any match of the request content against any pre-defined provisioning configuration.

If another service requests arises that is not associated with a pre-defined provisioning configuration, the at least one driver is configurable or programmable according to each network element 112 to handle various flow management requirements, particularly by redefining any business rule or provisioning flow or command.

Thus, by way of dynamic flow management at least one processor 118 associated with a network element 112 may translate automatically at least one incoming request for activating, modifying, upgrading or canceling at least one subscription service or access wirelessly to text, audio, video or other multi-media content or applications. The at least one provisioning command or equivalent code or computer instruction corresponds to the translated at least one incoming request.

The dynamic flow management and conditional logic provisioning command driver or other command configuration are specified automatically, for example, in a SQL relational database table using at least one Boolean or other logical expression. Wireless network service re-provisioning is accomplished efficiently simply by mapping use-cases associated with at least one pre-determined wireless network subscriber service requests logically to corresponding at least one provisioning command.

Thus, in comparison to conventional approach of re-coding and re-compiling each new software production build or fix debug cycle when re-configuring network services software, there is no need to suffer additional transactional service re-coding delay or software production build or fix debug cycle.

Further, to minimize reconfiguration delay in the case of reverting to prior reference data, a SQL script may be deployed automatically by reverting to the reference data, without suffering a transactional service re-coding delay or software production build or fix debug cycle. The transactional service re-coding delay or software production build or fix debug cycle is the conventional approach to re-code and re-compile each new software production build or fix debug cycle when re-configuring network services software.

In an automated wireless network exemplary illustration, at least one network element 112 provisions a subscriber unit 100 after receiving a provisioning command from a server 109, which is substantially real-time, to provide dynamically a wireless subscriber network service update. This network service may be in response to a subscriber request, and at least one driver or other equivalent software that automatically generates or uses at least one proprietary and/or conditional Boolean or other logical expressions, along with a corresponding software parser.

This dynamic approach enables at least one processor 118 to perform automatic checking of any incoming network service request by at least one subscriber unit 100. The at least one processor 118 also may perform a look-up, if necessary, of any pre-determined network service descriptions in at least one memory 116.

Additionally the at least one processor 118 also may perform a comparison of any detected at least one network service request against any pre-determined network service descriptions. Furthermore, the at least one processor 118 may perform parsing of any detected at least one network service request to enable automated provisioning of network services using the at least one driver or other command configuration.

Such at least one driver or other command configuration may be specified automatically in a SQL relational database table using at least one Boolean or other logical expression. This automated approach facilitates processing of at least one incoming wireless network service request or other wireless network activity. The incoming wireless network service request or other wireless network activity may be correspondingly stored in at least one SQL relational database table for provisioning as defined correspondingly with at least one wireless network service request.

At least one driver or other equivalent software may use programmable language or format including at least one Boolean or other logical expression. Also, the corresponding software parser is configured to parse or otherwise understand such Boolean or other logical format. Hence, the software parser may drive and execute at least one corresponding command automatically to provision at least one network element and/or subscriber unit.

The dynamic flow management and conditional logic provisioning command driver may facilitate network service reconfiguration and/or re-provisioning efficiently among at least one network element and subscriber unit in a network. This approach is based on detecting network service or transaction request, without actual code development or redeployment delay, at least in part by using at least one business rule in the form of a Boolean or other logical expression (i.e., "logical expression") and corresponding flows by way of the parser to map automatically at least one command provided in a SQL relational database table.

In general, at least one driver may enable processor execution of at least one software application dynamically to manage at least one flow associated conditionally with at least one network request, such that conditional flow management is automated dynamically to enable un-compiled re-provisioning of at least one command associated with at least one requested network service.

Hence, by not requiring additional compilation support of requested network services, it is contemplated herein that higher speed and more reliable logic provisioning of network services may be obtained advantageously via this expedited approach. For example, at least one subscriber-requested network service, such as upgraded multi-media access, or subscription activation/de-activation, may be provisioned automatically by server-based network providers as configured herein to provide the at least one subscriber-requested network service without having to re-compile the server-based network provider software upon re-provisioning of wireless network services as an illustrative example of system 150 in operation.

In particular, a database driven provisioning flow without having to recompile code may be facilitated by accessing a library of reusable commands stored in at least one memory 116, e.g., cache memory. Such commands are accessible to the at least one processor 118 handling the at least one incoming wireless subscriber network service request.

Also, by using the reusable library of commands, it is further contemplated herein that higher speed and more reliable logic provisioning of network services is accomplished via such a reusable approach.

Further, at least one update to the network service by way of a provisioning command, a re-provisioning, may comply with at least one programmable business rule for dynamic flow management stored in the cache memory. For example, at least one business rule may define subscriber access to upgraded/downgraded multi-media content, such as data, audio/music, video/movies, and game applications.

Additionally, the at least one business rule may provide subscriber incentives, such as discounted or free service credits or tokens to build subscriber participation or loyalty relationship. Moreover, by using cache memory to store business rules dynamically for flow management, it is further contemplated herein that higher speed and more reliable logic provisioning of network services is accomplished via the cached approach.

It is further contemplated herein that at least one network request may enable dynamic flow management of at least one conditional logic provisioning command driver generated automatically by the processor according to at least one business rule, and such at least one network request is configured substantially according to an Extensible Markup Language (XML) or other substantially equivalent format.

Also, by using XML/.xml format to configure network requests automatically to provide command drivers according to business rules, it is further contemplated herein that more reliable logic provisioning of network services is accomplished via such an XML approach.

Continuing with the illustrative example of using system 150 for provisioning Additionally in one example using dynamic flow management system 150 with respect to a wireless network involving incoming wireless subscriber network service request, in one illustration at least one subscriber 100 uses a mobile, cellular, smartphone, tablet or other wireless telecommunication device desires to change a wireless network service, for example, by upgrading from one device to another device.

Accordingly, a subscriber may interact with a subscriber unit 100 effectively as a point-of-sale or front-end of a wireless service network 110, which may cause a billing module or application in a mobile computing device activation application running at least one network element 112 or subscriber unit 100 to send a wireless network service change request in .xml format to change wireless network service accordingly. As noted above, a subscriber unit 100 may incorporate a single subscriber interface or a plurality of such interfaces (e.g., as part of an overall billing system) that then sends the request to the at least one server 109.

In response to detecting receipt of the wireless network service change request 202, the server 109 may translate as shown at block 206 such a request into at least one command and corresponding parameter for dispatch automatically directly to a network element 112 or from server 109 to the network element 112 by way of subscriber device 100 in communication with server 109, which is affected functionally or transactionally by the wireless network service change request. Because wireless network services may be vendor-centric, each network element 112 may have a unique set of commands and corresponding parameters for enabling dynamic flow management.

Thus, each process invoked to provision incoming service request has a dedicated provisioning process that corresponds with a specifically corresponding network element 112. Thus, vendor-centric commands and corresponding parameters are processed automatically according to the unique subscriber service request.

In this dedicated manner, there is a traceably unique provisioning process represented by translating a command into a provisioning command appropriate for a specific network element 112. For example, a particular server 109 may translate at block 206 an incoming .xml request into at least one corresponding flow command that the particular receiving network element 112 handles properly. Pre-defined or programmable business rules are used by the network element 112 automatically to translate the incoming request into provisioning commands.

Because the dynamic flow management approach facilitates translation of service requests uniquely into provisioning commands flexibly using .xml formatted requests, configurable business rules and Boolean logic format using the at least one driver, it is possible to define and change automatically the generation of provisioning commands. This automated command generation enables handling real-time wireless network service change requests.

Furthermore, such automated command generation is accomplished without hard-coding provisioning logic in code that would require undesirable server provisioning software code change or fix, reinstall and recompile in a separate build cycle and delay.

Moreover, the mobile telephone activation application running on the network element 112 tracks upstream subscriber activity and settings, such as wireless network services that the requesting subscriber has in his or her billing plan. Multiple requests for wireless network service change are automatically queued at each affected network element 112. For example, such requests may depend on the wireless network service change based on the subscriber billing plan.

Different wireless network service requests types (e.g., activation, change, upgrade, or cancel) may be automatically handled by translating at block 206 each request separately. This translation enables generation of an appropriate flow to manage the requesting subscriber service.

In particular, the generated flow may be implemented by generating an appropriate command using logical expression with and the at least one driver created as shown at block 206. The generated command may then be sent as shown at block 208 to the corresponding network element to provision the requesting subscriber unit 100.

The foregoing computer-automated software approach may use a dynamic flow management and conditional logic provisioning command driver programmably in software. For example, in a representative case of a wireless network service request for subscriber billing is received, such software determines automatically at least one provisioning command based on at least one provisioning activity defined in the billing request.

In this conditionally programmable case, a value in an XML tag or existence of a tag and/or value may drive different commands conditionally to at least one network element. For example, one transaction or service request may drive multiple commands to at least network element, so that at least one value or content in such transaction or service request may be mapped using different commands correspondingly within the application code as programmed conditionally.

One or more illustrative examples for programming the foregoing computer-automated software approach may use at least one command CheckIfs to implement if-then conditional logic, such that if a Boolean expression (i.e., conditional true/false expression) is true, then a corresponding conditional Command will be executed; each CheckIf entry being independent of any previous entry. Additionally, the foregoing computer-automated software approach may use at least one command CheckIfElse to implement if-then-else conditional logic; e.g., when implementing mutually exclusive Boolean expression (i.e., conditional true/false expression; for example, with multiple CheckIfElse entries, only one such expression can be true and will drive the corresponding conditional command).

Figure 3:
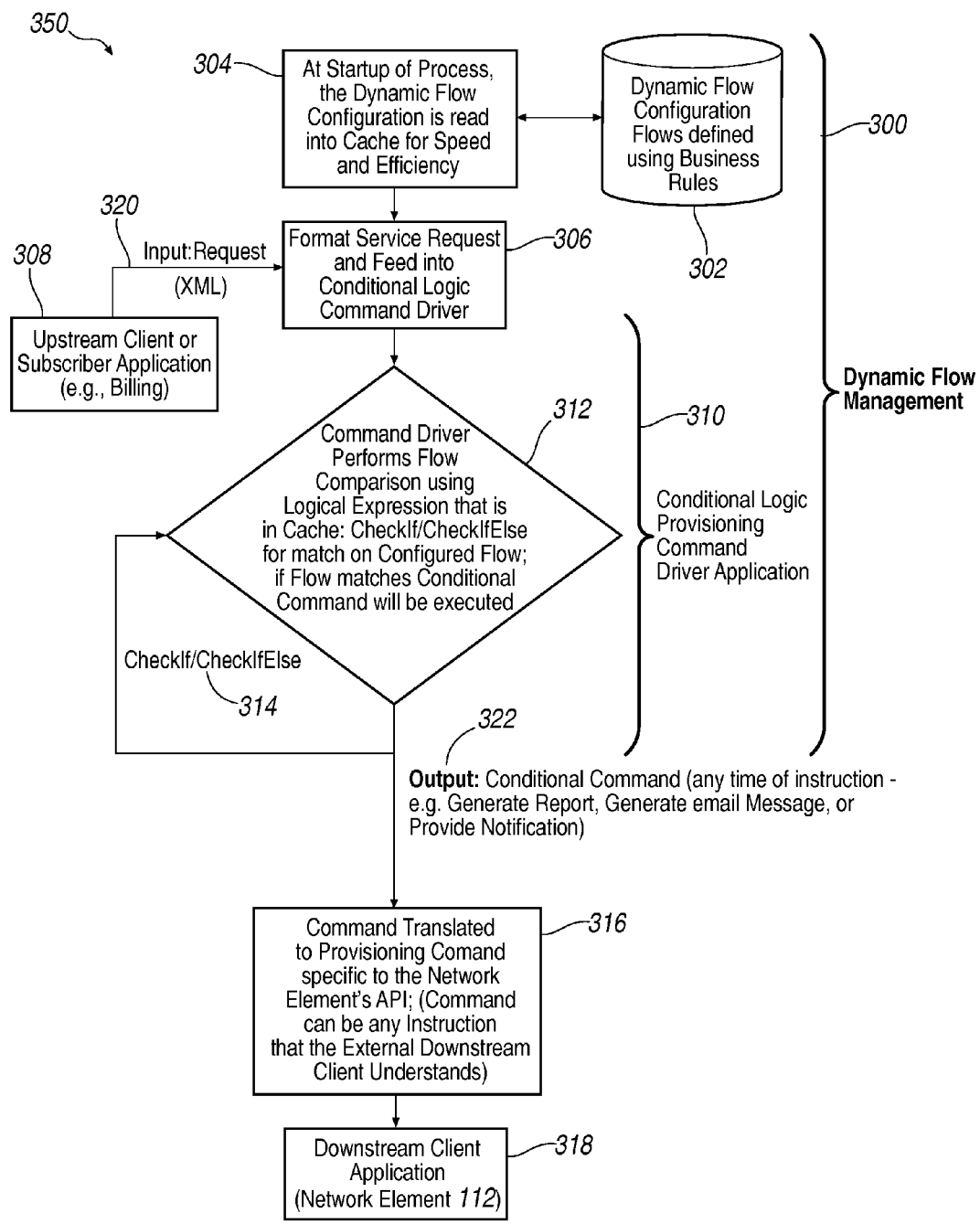
FIG. 3 illustrates an exemplary process flow of providing a dynamic flow management and a conditional logic provisioning command driver in response to at least one network request.

FIG. 3 illustrates another more generalized exemplary process flow 350 for network service provisioning that shows various aspects of dynamic flow management 300 computational steps, without being limited to wireless network service provisioning of subscriber requests. For example, such steps may be performed by at least one processor 118 that automatically processes incoming requests per subscriber 100, using conditional logic provisioning command driver application 310.

Initially, at least one processor 118 stores or accesses at least one dynamic flow configuration as shown at block 304 into cache or memory 116 to facilitate high-speed and efficient storage and access. A dynamic flow configuration is stored at block 302 and defined using business rules such as those represented by a logical expression or Boolean expressions as discussed above. Such a configuration shown at block 302 may include alphanumeric/text information.

Next, at least one processor 118 detects or receives at block 306 an .xml format service request 320 from an upstream subscriber client 100, as may be generated by any subscriber or client application 308, such as a billing application that tags subscriber state for a certain transaction service request, for example. The .xml format service request 320 may be provided automatically to block 306 and from block 306 into at least one driver application 310, which performs at least one flow management comparison or parsing at decision point 312 using logic expressions provided in cache memory 116. In other words, does a request match a business rule? If it does then a resultant flow results without the need to do any complicated or difficult recoding or recompiling.

For instance, the at least one driver application 310 may use decision point 312 Checkif/CheckifElse code logically conditionally as shown by input 314 to determine at least one business rule match on the configured flow based on a requested wireless network service change. Each iteration corresponds to a CheckIf/Else expression 314 in the configuration and may result in a command translation shown at block 316. If a rule does match then a flow is initiated representing at least one corresponding conditional command is executed to provision the requested wireless network service change. Furthermore, if there is no match determined then no provisioning command is provided, unless an exception condition is pre-defined to handle a no-match condition.

While the conditional command is illustrated for a particular exemplary purpose, it is to be appreciated that the present system may relate to any computational instruction for possible use with a network element 112 (e.g. provisioning a network service configuration or notifications such as transaction, report or e-mail generation) as shown at element 322.

Thus, the provisioning output 322, 208 may include at least one conditional command, such as various instructions to do such things as generate a report, provision a printer, generate an e-mail message, provide a notification to a particular network element 112 or subscriber unit 100, etc. More generally, the output 322, 308 represents any computational instruction that affects a network element 112. The output command 322 may be converted or translated 316 according to any provisioning command format requirement, for example, to comply with an application programming interface (API) for a particular downstream network element 112 as shown by block 318.

Figure 4:
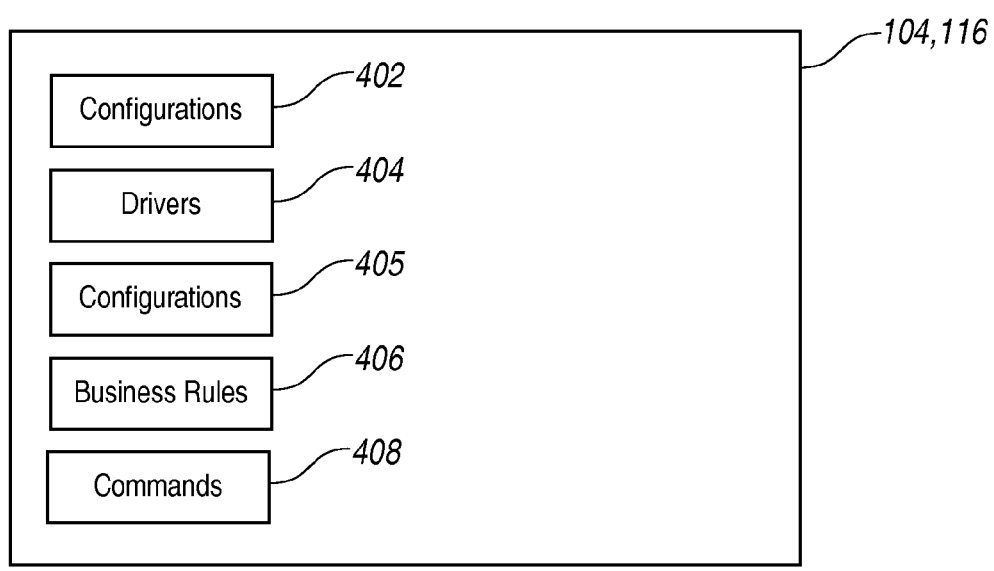
FIG. 4 illustrates exemplary data structures stored electronically in digital memory including configurations, drivers, rule sets, Boolean logic, business rules, and commands.

FIG. 4 illustrates exemplary data structures, as described herein, stored electronically in digital memory 116, including flow processing configurations 402, at least one driver 404, at least one rule set or configuration 405, at least one business rule 406, and at least one provisioning command 408.

Figure 5:
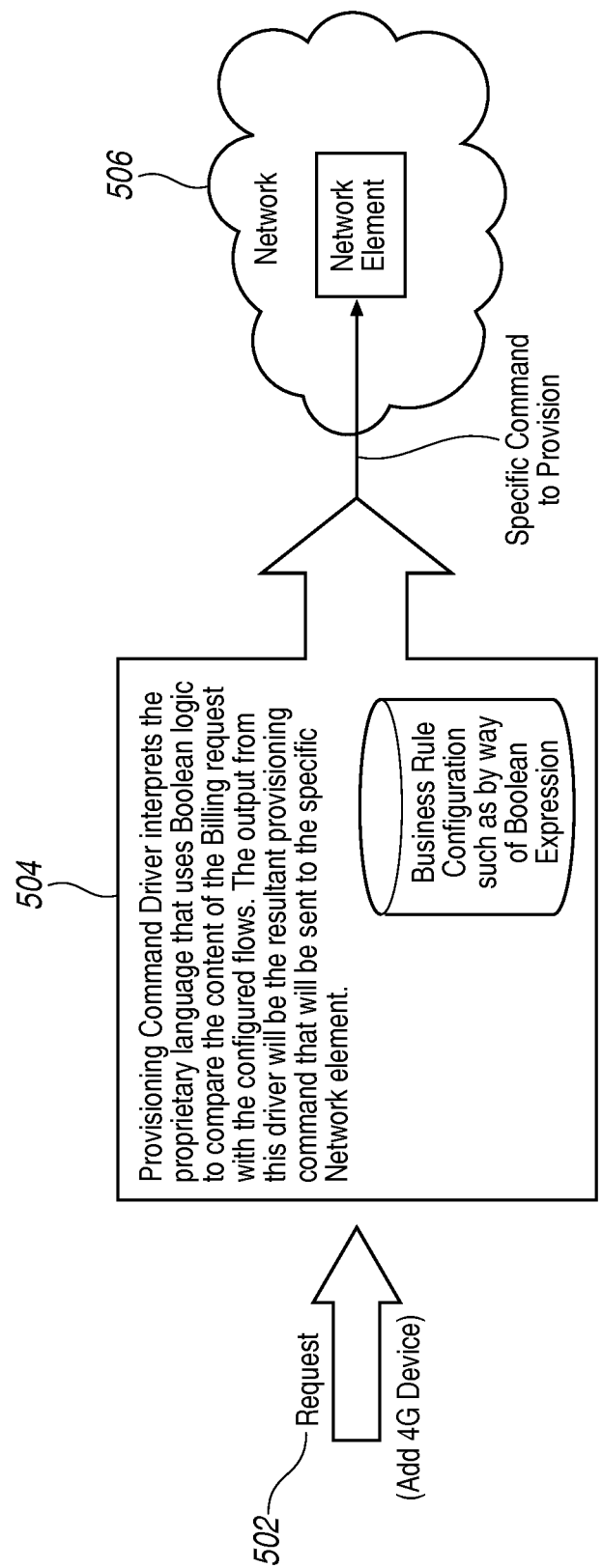
FIG. 5 illustrates an exemplary dynamic flow management data flow from input request, through configuration processing, and command provisioning.

FIG. 5 illustrates an exemplary dynamic flow management data flow from input request, through configuration processing, and command provisioning. For example, wireless network service request 502 is received for dynamic flow management to add a 4G device for a particular subscriber. Then at least one driver 504 interprets the request to use a logical expression for the requested configuration. The at least one driver 504 then generates a command output to at least one network element 506 to satisfy the wireless network service request provisioning.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite at least one indicated element unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device configured to execute a software application on a processor of the computing device to provide operations comprising: receiving a network request by a processor accessible in a network from at least one requesting subscriber unit subscribing to a first network configuration; and providing a conditional logic provisioning command driver in response to the network request by the processor for reconfiguring the first network configuration to a second network configuration according to the received network request; wherein the conditional logic provisioning command driver enables the processor execution of the software application to dynamically manage at least one flow associated conditionally with the network request, such that conditional flow management is automated dynamically to enable the un-compiled re-provisioning of at least one command associated with at least one requested network service; and wherein the un-compiled re-provisioning of network services is facilitated by accessing a library of reusable commands stored in a cache memory accessible to the processor.

2. The device of claim 1, the conditional logic provisioning command driver representing at least computational instruction and the network configuration representing at least one of provisioning a network service configuration and a notification configuration.

3. The device of claim 2, the processor being associated with a server disposed between the at least one requesting subscriber unit and a network element subject to the reconfiguring.

4. The device of claim 3, wherein an output command from the command driver is configured into a provisioning command specific to the network element for undertaking the reconfiguring of the first network configuration to the second network configuration.

5. The device of claim 1, wherein the conditional logic provisioning command driver comprises software code configured to execute conditionally according to at least one business rule associated with at least one network service defined by the network request, and said command driver being accessible programmably using a software-implemented parser by the processor from at least one relational database.

6. The device of claim 1, wherein at least one re-provisioned network service complies with at least one business rule for dynamic flow management stored in the cache memory.

7. The device of claim 1, wherein the network request enables dynamic flow management of at least one conditional logic provisioning command driver generated automatically by the processor according to at least one business rule, and the network request is configured substantially according to an Extensible Markup Language (XML) format.

8. A method, comprising: receiving a network request by a processor accessible in a network from at least one requesting subscriber unit subscribing to a first network service configuration; providing a conditional logic provisioning command driver in response to the network request by the processor for reconfiguring the first network service configuration to a second network service configuration according to the received network request, the conditional logic provisioning command driver enabling the processor execution of the software application for dynamically managing at least one flow associated conditionally with at least one network request, such that conditional flow management is automated dynamically to enable un-compiled re-provisioning of at least one command associated with at least one requested network service; and accessing a library of reusable commands stored in a cache memory accessible to the processor to facilitate the un-compiled re-provisioning of at least one command associated with at least one requested network service.

9. The method of claim 8, wherein the conditional logic provisioning command driver comprises software code configured to execute conditionally according to at least one Boolean logic condition associated with at least one network service defined by the network request, and said command driver being accessible programmably using a software-implemented parser by the processor from at least one relational database.

10. The method of claim 8, wherein at least one re-provisioned network service complies with at least one business rule for dynamic flow management stored in the cache memory.

11. The method of claim 8, wherein at least one network request enables dynamic flow management of at least one conditional logic provisioning command driver generated automatically by the processor according to at least one business rule, and such at least one network request is configured substantially according to an Extensible Markup Language (XML) format.

12. A non-transitory computer-readable medium tangibly embodying computer-executable instructions of a software program, the software program being executable by a processor of a computing device to provide operations comprising: receiving a network request by a processor accessible in a network from at least one requesting subscriber unit subscribing to a first network service configuration; providing a conditional logic provisioning command driver in response to the network request by the processor to reconfigure the first network service configuration to a second network service configuration according to the received network request, the conditional logic provisioning command driver enabling the processor execution of the software application to dynamically manage at least one flow associated conditionally with at least one network request, such that conditional flow management is automated dynamically to enable un-compiled re-provisioning of at least one command associated with at least one requested network service; and accessing a library of reusable commands stored in a cache memory accessible to the processor to facilitate the un-compiled re-provisioning of at least one command associated with at least one requested network service.

13. The medium of claim 12, wherein the conditional logic provisioning command driver comprises software code configured to execute conditionally according to at least one business rule associated with at least one network service defined by the network request, and the command driver being accessible programmably using a software-implemented parser by the processor from at least one relational database.

14. The medium of claim 12, wherein at least one re-provisioned network service complies with at least one proprietary business rule for dynamic flow management stored in the cache memory.

15. The medium of claim 12, wherein at least one network request enables dynamic flow management of at least one conditional logic provisioning command driver generated automatically by the processor according to at least one business rule, and such at least one network request is configured substantially according to an Extensible Markup Language (XML) format.

* * * * *